US011901629B2

(12) United States Patent
Peterson et al.

(10) Patent No.: US 11,901,629 B2
(45) Date of Patent: Feb. 13, 2024

(54) DEPLOYABLE ANTENNA REFLECTOR

(71) Applicant: Eagle Technology, LLC, Melbourne, FL (US)

(72) Inventors: Ian Peterson, Rochester, NY (US); Andrew Bucossi, Rochester, NY (US)

(73) Assignee: Eagle Technology, LLC, Melbourne, FL (US)

( * ) Notice: Subject to any disclaimer, the term of this patent is extended or adjusted under 35 U.S.C. 154(b) by 63 days.

(21) Appl. No.: 17/489,951

(22) Filed: Sep. 30, 2021

(65) Prior Publication Data

US 2023/0115989 A1 Apr. 13, 2023

(51) Int. Cl.
*H01Q 15/14* (2006.01)
*H01Q 15/16* (2006.01)
*H01Q 1/28* (2006.01)

(52) U.S. Cl.
CPC ............ *H01Q 15/14* (2013.01); *H01Q 1/288* (2013.01)

(58) Field of Classification Search
CPC .......... H01Q 1/28; H01Q 1/288; H01Q 15/14; H01Q 15/16; H01Q 15/161
See application file for complete search history.

(56) References Cited

U.S. PATENT DOCUMENTS 1,079,740 A 11/1913 Schmuel et al.
2,072,262 A 3/1937 Herzog et al.
4,609,923 A 9/1986 Boan et al.
4,812,854 A 3/1989 Boan et al.
4,926,181 A * 5/1990 Stumm ................ H01Q 15/161 343/915
5,686,930 A 11/1997 Brydon
5,864,324 A 1/1999 Acker et al.
6,590,231 B2 7/2003 Watanabe et al.
(Continued)

FOREIGN PATENT DOCUMENTS

CN 106159456 A 11/2016
EP 0617481 9/1994
(Continued)

OTHER PUBLICATIONS

Extended European Search Report dated Nov. 14, 2022 in corresponding European Patent Application No. 22174300.8 (11 pages).
(Continued)

*Primary Examiner* — Tho G Phan
(74) *Attorney, Agent, or Firm* — Fox Rothschild LLP; Carol E. Thorstad-Forsyth

(57) ABSTRACT

Deployable reflector system includes a support structure and a reflector surface secured to the support structure. The support structure transition from a compact stowed configuration to a larger deployed configuration to deploy the reflector surface. The reflector surface is comprised of a carbon nanotube (CNT) sheet. The sheet is intricately folded in accordance with a predetermined folding pattern to define a compact folded state. This predetermined folding pattern is configured to permit automatic extension of the CNT sheet from a compact folded state to a fully unfolded state. The unfolding operation occurs when a tension force is applied to at least a portion of the peripheral edge of the CNT sheet. In some scenarios, the support structure can comprise a circumferential hoop.

25 Claims, 8 Drawing Sheets

(56) References Cited

U.S. PATENT DOCUMENTS

| | | | |
|---|---|---|---|
| 6,828,949 | B2 * | 12/2004 | Harless .................. H01Q 15/20 343/915 |
| 6,864,857 | B2 * | 3/2005 | Crouch .................. H01Q 15/14 343/912 |
| 6,901,249 | B1 | 5/2005 | Kobayashi |
| 6,975,282 | B2 * | 12/2005 | Kaufman ............. H01Q 1/1207 343/915 |
| 7,354,877 | B2 | 4/2008 | Rosenberger et al. |
| 7,714,798 | B2 | 5/2010 | Lashmore et al. |
| 7,734,271 | B2 | 6/2010 | Pepper et al. |
| 8,356,774 | B1 | 1/2013 | Banik et al. |
| 8,384,613 | B1 | 2/2013 | Murphey et al. |
| 8,462,078 | B2 | 6/2013 | Murphey et al. |
| 8,548,415 | B2 | 10/2013 | Pesetski et al. |
| 8,654,033 | B2 | 2/2014 | Sorrell et al. |
| 8,926,933 | B2 | 1/2015 | Zhang et al. |
| 9,156,568 | B1 | 10/2015 | Spence et al. |
| 9,214,722 | B2 | 12/2015 | Georgakopoulos et al. |
| 9,276,305 | B2 | 3/2016 | Keller et al. |
| 9,318,808 | B1 | 4/2016 | Weaver et al. |
| 9,496,436 | B2 | 11/2016 | Hui et al. |
| 9,512,545 | B2 | 12/2016 | Zhang et al. |
| 9,605,363 | B2 | 3/2017 | Zhang et al. |
| 9,810,820 | B1 | 11/2017 | Starkovich et al. |
| 10,447,178 | B1 | 10/2019 | Hays et al. |
| 10,651,531 | B2 * | 5/2020 | Palisoc .................... B64G 1/66 |
| 10,715,078 | B2 | 7/2020 | Jeon et al. |
| 10,797,402 | B2 * | 10/2020 | Shmuel .................. B64G 1/222 |
| 10,899,102 | B1 * | 1/2021 | Starkovich ............ C01B 32/158 |
| 11,600,929 | B2 | 3/2023 | Socransky |
| 2001/0023968 | A1 | 9/2001 | Smith et al. |
| 2002/0014999 | A1 | 2/2002 | Crowley |
| 2004/0002357 | A1 | 1/2004 | Benveniste |
| 2004/0023576 | A1 | 2/2004 | Rock et al. |
| 2005/0009593 | A1 | 1/2005 | Falciglia |
| 2005/0056877 | A1 | 3/2005 | Rueckes et al. |
| 2005/0095938 | A1 | 5/2005 | Rosenberger et al. |
| 2005/0179594 | A1 | 8/2005 | Morikawa et al. |
| 2005/0282515 | A1 | 12/2005 | Bertin |
| 2006/0027030 | A1 | 2/2006 | Schofl |
| 2006/0261433 | A1 | 11/2006 | Manohara et al. |
| 2006/0270301 | A1 | 11/2006 | Marks |
| 2007/0281657 | A1 | 12/2007 | Brommer et al. |
| 2008/0063585 | A1 | 3/2008 | Smalley et al. |
| 2008/0223431 | A1 | 9/2008 | Chu |
| 2008/0251723 | A1 | 10/2008 | Ward et al. |
| 2010/0086729 | A1 | 4/2010 | Long |
| 2010/0258111 | A1 | 10/2010 | Shah et al. |
| 2011/0009751 | A1 | 1/2011 | McGuire, Jr. et al. |
| 2011/0097512 | A1 | 4/2011 | Zhou et al. |
| 2011/0180661 | A1 | 7/2011 | Weaver |
| 2012/0055013 | A1 | 3/2012 | Finn |
| 2012/0312343 | A1 | 12/2012 | VanVechten et al. |
| 2015/0329363 | A1 | 11/2015 | Sullivan |
| 2016/0376747 | A1 | 12/2016 | Wang et al. |
| 2017/0001866 | A1 | 1/2017 | Zhang et al. |
| 2017/0027439 | A1 | 2/2017 | Shimizu et al. |
| 2017/0120220 | A1 | 5/2017 | Watanabe et al. |
| 2017/0274390 | A1 | 9/2017 | Manyapu et al. |
| 2018/0278200 | A1 | 9/2018 | Jeon et al. |
| 2019/0221944 | A1 | 7/2019 | Harless et al. |
| 2020/0362236 | A1 | 11/2020 | Cui et al. |
| 2021/0036429 | A1 | 2/2021 | Rommel et al. |
| 2021/0098888 | A1 | 4/2021 | Socransky |
| 2021/0257743 | A1 | 8/2021 | Puchades et al. |

FOREIGN PATENT DOCUMENTS

| | | | |
|---|---|---|---|
| EP | 0917283 | A2 | 5/1999 |
| EP | 1727239 | A1 | 11/2006 |
| EP | 2290511 | A2 | 3/2011 |
| EP | 3059800 | B1 | 11/2017 |
| KR | 20070071918 | A | 7/2007 |
| TW | 201035341 | A | 10/2010 |
| WO | 2001003208 | A1 | 1/2001 |
| WO | 2004030043 | A2 | 4/2004 |
| WO | 2017120478 | A1 | 7/2017 |

OTHER PUBLICATIONS

High Frequency Reflective Mesh for Small Aperture Antennas, SBIR Award, Tracking No. 156678, funding solicited in 2016, awarded in 2017 https://www.sbir.gov/sbirsearch/detail/1425893.

Nanocomp Technologies, Inc. A Huntsman Company, Miralon Yarn, http://www.miralon.com/yarn, copyright 2016 Nanocomp Technologies Inc.

Shirasu, Keiichi & Yamamoto, Go & Tamaki, Itaru & Ogasawara, Toshio & Shimamura, Yoshinobu & Inoue, Yoku & Hashida, Toshiyuki. (2015). Negative axial thermal expansion coefficient of carbon nanotubes: Experimental determination based on measurements of coefficient of thermal expansion for aligned carbon nanotube reinforced epoxy composites. Carbon. 95. 904-909. 10.1016/j.carbon.2015.09.026.

G. Hidden, L. Boudou, S. Remaury, P. Nabarra, E. Flahaut and J. M. Vega, "Development of CNT-polysiloxane composites for spacecraft applications," Proceedings of the 2004 IEEE International Conference on Solid Dielectrics, 2004. ICSD 2004., Toulouse, France, 2004, pp. 955-958 vol.2, doi: 10.1109/ICSD.2004.1350590.

European Search Report issued in EP 20186379 dated Nov. 25, 2020.

J. Beigbeder, P. Demont, S. Remaury, P. Nabarra and C. Lacabanne , Incorporation of Nanoparticles in a Flexible Solar Reflector for Geostationary Applications, International Symposium on Materials in a Space Environment, 2009.

Andreas Ericsson, Romain Rumpler, Daniel Sjoberg, Peter Goransson, Niklas Wellander, Joakim Johansson, A combined electromagnetic and acoustic analysis of a triaxial carbon fiber weave for reflector antenna applications, Aerospace Science and Technology, vol. 58, Nov. 2016, pp. 401-417.

"Tunable Mechanical Metamaterials through Hybrid Kirigami Structures" Hwang, D., Bartlett, M.D. Tunable Mechanical Metamaterials through Hybrid Kirigami Structures. Sci Rep 8, 3378 (2018) doi:10.1038/s41598-018-21479-7.

"Lasec: Instant Fabrication of Stretchable Circuits Using a Laser Cutter" Daniel Groeger and Jürgen Steimle. 2019. In Proceedings of the 2019 CHI Conference on Human Factors in Computing Systems (CHI '19). ACM, New York, NY, USA, Paper 699, 14 pages. DOI: https://doi.org/10.1145/3290605.3300929.

"Graphene kirigami" Melina K. Blees, Arthur W. Barnard, Peter A. Rose, Samantha P. Roberts, Kathryn L. McGill, Pinshane Y. Huang, Alexander R. Ruyack, Joshua W. Kevek, Bryce Kobrin, David A. Muller & Paul L. McEuen, Aug. 13, 2015.

"Carbon Nanotube Assembly and Integration for Applications" Anusha Venkataraman, Eberechukwu Victoria Amadi, Yingduo Chen, Chris Papadopoulos Nanoscale Res Lett. 2019; 14: 220. Published online Jul. 1, 2019.

El-sherbiny, Sh.G. & Wageh, S. & Elhalafawy, S.M. & Sharshar, A.A . . . (2013). Carbon nanotube antennas analysis and applications: review. Advances in nano research.

Williams and Ruth "Antennas of flexible nanotube films an alternative for electronics" Jun. 10, 2019, News Releases.

* cited by examiner

DEPLOYABLE ANTENNA REFLECTOR

BACKGROUND

Statement of the Technical Field

The inventive arrangements relate to reflector antenna systems and more particularly to methods and systems for deployable antenna reflectors.

Description of the Related Art

Reflector antenna systems are used on satellites and other systems that communicate using radio-frequency (RF) energy and other types of electromagnetic energy. In a reflector antenna system, a reflector surface is provided that focuses the RF energy that is being received or transmitted. In some scenarios, a reflector may have a generally parabolic shape. To support the reflector surface, various conventional antenna structures may be provided. For example, these antenna support structures include radial rib designs, folding rib designs, and designs which utilize a hoop. In many of these antenna designs, the structure is made to support to a flexible antenna reflector surface attached thereto. For example, a plurality of battens, cords, wires, guidelines, or other tensile members may be used to couple the flexible antenna reflector surface to the structure. In some scenarios, the battens, wires and/or guidelines define and maintain the shape of the flexible antenna reflector surface when it is deployed. In the case of a deployable reflector the antenna structure is often designed to be collapsible so that it can be transitioned from a stowed configuration to a deployed configuration. In the stowed position, the structure is collapsed into a relatively small space as compared to when fully deployed.

The trend in the space antennas market is a continued push towards higher frequency applications and larger size reflectors. This trend has created many design challenges. For example, reflector surfaces used in many conventional antenna designs are made of woven gold-plated molybdenum mesh (Au/Mo) mesh. However, certain performance characteristics of Au—Mo mesh can degrade at higher frequencies. Weight and cost of such Au/Mo mesh reflectors can also be a concern. Other reflector surfaces can be used can be used in place of Au/Mo mesh, but these surface materials can themselves create design challenges with regard to suitable methods and systems for stowage and deployment.

SUMMARY

Embodiments concern a deployable reflector system. The system includes a support structure and a reflector surface secured to the support structure. The support structure is configured to transition from a compact stowed configuration to a larger deployed configuration. The reflector surface is comprised of a carbon nanotube (CNT) sheet which is highly reflective of electromagnetic waves. The sheet is intricately folded in accordance with a predetermined folding pattern to define a compact folded state when the support structure is in the stowed configuration. This predetermined folding pattern is configured to permit automatic extension of the CNT sheet from the compact folded state to a fully unfolded state. The unfolding operation occurs when a tension force is applied to at least a portion of the CNT sheet by the support structure. For example, such unfolding operation can advantageously occur as a result of transitioning the support structure from the stowed configuration to the deployed configuration.

In some scenarios, the support structure can comprise a circumferential hoop. An outer peripheral edge of the CNT sheet can be secured to the circumferential hoop. The circumferential hoop in the compact stowed configuration has a first diameter that is minimized for compact storage. When in the larger deployed configuration, the circumferential hoop has a second diameter which is substantially larger than the first diameter. The CNT sheet is responsive to the transition of the circumferential hoop from the compact stowed configuration to the larger deployed configuration for causing the CNT sheet to transition from the compact folded state to the fully unfolded state.

In some scenarios, the CNT sheet is comprised of a laser cut mesh. However, the solution is not limited in this regard. In other scenarios, the CNT sheet can be comprised of a solid, non-mesh, surface. Also, the CNT sheet can be comprised of a weave or a knit. The CNT sheet is advantageously comprised of a plurality of separate pieces of CNT sheet. The size and shape of the pieces can be selected so that when the pieces are bonded together in a predetermined piece pattern, the resulting sheet (when in an unfolded state) can define a smooth concave or parabolic shape.

The CNT sheet is advantageously folded in accordance with an intricate predetermined folding pattern to permit the CNT sheet to have a compact state when the support structure is in the stowed configuration. In some scenarios, the predetermined folding pattern is defined by three primary fold elements including an inner polygon, an outer polygon, and a plurality of wedges. The inner polygon and the outer polygon are formed to have a common center point. Further, the inner polygon can advantageously have predetermined number corners defined by the value n, in which case the outer polygon may have a predetermined number of points or corners defined by the value 2n. The predetermined folding pattern is chosen such that each wedge is defined by a pair of wedge fold lines which respectively extend from adjacent corners of the inner polygon to alternate corners of the outer polygon. According to a further aspect, each wedge is folded to form a plurality of segments. More particularly, each segment can be defined by a plurality of cross-fold lines respectively associated with a plurality of cross-folds, the cross-fold lines of each wedge extending parallel to one another between opposing wedge fold lines of the wedge.

A solution disclosed herein can also comprise a method for deploying a reflector system. The method can involve intricately folding a carbon nanotube (CNT) sheet in accordance with a predetermined folding pattern. This folding process allows the CNT sheet to be configured in a compact folded state. The method can further involve forming or selecting the materials of the CNT sheet so that the CNT sheet is highly reflective of electromagnetic waves. The predetermined folding pattern is advantageously selected to permit automatic extension of the CNT sheet from the compact folded state to a fully unfolded state. For example, this automatic extension can occur when a tension force is applied to at least a portion of peripheral edge of the CNT sheet. Further, the CNT sheet is secured to a support structure which is transitioned from a compact stowed configuration to a larger deployed configuration to deploy the reflector surface.

The method can include arranging the support structure to define a circumferential hoop and securing an outer peripheral edge of the reflector surface to the periphery of circumferential hoop. The configuration of the circumferential hoop is selected so that in the compact stowed configuration it has a first diameter that is minimized for compact storage, and in the larger deployed configuration has a second diameter substantially larger than the first diameter. As such, the method can further involve causing the CNT sheet to transition from the compact folded state to the fully unfolded state by enlarging the circumferential hoop from the compact stowed configuration to the larger deployed configuration to. In some scenarios, the method can involve forming the CNT sheet in a concave or parabolic shape. This can be accomplished by a process which involves bonding together a plurality of separate pieces of CNT sheet in a predetermined piece pattern.

With the method as described herein the predetermined folding pattern can be implemented or defined by three primary fold elements including an inner polygon, an outer polygon, and a plurality of wedges. The inner polygon and the outer polygon are formed so as to have a common center point. Further, the inner polygon has predetermined number corners defined by the value n, and the outer polygon has a predetermined number of points or corners defined by the value 2n. The method also involves forming each of the plurality of wedges with a pair of wedge fold lines which respectively extend from adjacent corners of the inner polygon to alternate corners of the outer polygon. A plurality of cross-folds defined along cross-fold lines are used to form a plurality of segments from each of the plurality of wedges. The cross-fold lines of each wedge extend parallel to one another between opposing wedge fold lines of the wedge.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
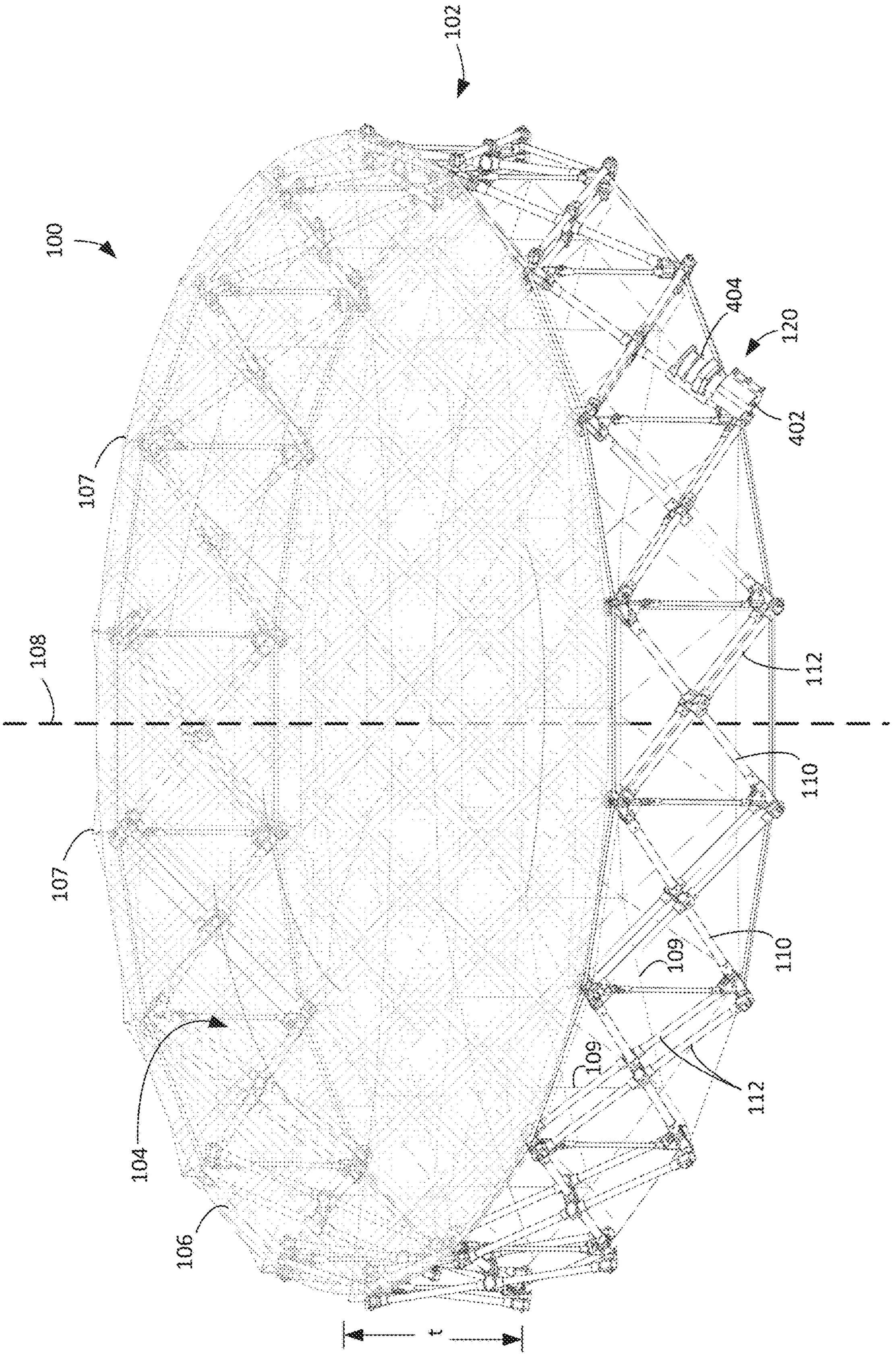
FIG. 1 is a perspective view of a deployed reflector antenna system which includes a reflector surface formed of a carbon nanotube material.

It will be readily understood that the components of the systems and/or methods as generally described herein and illustrated in the appended figures could be arranged and designed in a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

This disclosure concerns a deployable antenna reflector system incorporating a reflector surface formed of a flexible thin sheet comprised of a resin-stabilized carbon nanotube (CNT) material. An antenna system described herein includes a support structure which is designed to automatically transition from a compact stowed configuration to an extended configuration in which the support structure is fully deployed. The CNT sheet is stowed in a small packaging size by folding the sheet in accordance with a predetermined intricate pattern to achieve a compact stowed size. The predetermined intricate folding pattern applied to the CNT sheet is advantageously chosen in accordance with the design of the support structure so that the sheet can automatically deploy to its full extent concurrent with the transition of the support structure to its deployed configuration. For example, portions of the CNT can be advantageously secured to the support structure so that the CNT sheet automatically unfolds from its compact stowed size to its fully extended condition in response to the transition of the support structure from its stowed configuration to its deployed configuration. The described arrangement facilitates several improvements in the field of deployable reflector systems as compared to conventional reflector designs that comprise reflector surfaces made of woven gold-plated molybdenum (Au/Mo) mesh. For example, the system can facilitate improved cross-polarization performance at higher frequencies, a reduction in the weight of the reflector system, and the potential to reduce reflector costs.

In some scenarios, the support structure for the reflector system can comprise a hoop or hoop assembly. Accordingly, one embodiment of a deployable antenna reflector described herein comprises a hoop assembly which facilitates stowage and deployment of a CNT sheet reflector surface. However, it should be understood that other type of support structures can also be used to facilitate stowage and deployment of a folded CNT reflector surface. Different support structures having different configurations and/or deployment characteristics can require a different predetermined sheet folding pattern. In each instance, the folding pattern will be specifically chosen in accordance with the configuration of the particular support structure to facilitate automatic deployment.

A deployable reflector system (DRS) 100 will now be described with reference to FIGS. 1-4. The DRS 100 is comprised of a support structure which in this example is a hoop assembly 102. The hoop assembly 102 defines an interior space 104 for a deployable reflector surface 106. The deployable reflector surface is advantageously configured to reflect ElectroMagnetic ("EM") energy in the radio wave band of the EM spectrum. The hoop assembly 102 is configured to so that it can deploy to an expanded condition shown in FIGS. 1-3, and can collapse into a stowed condition shown in FIGS. 4A and 4B. To enhance the clarity of this disclosure, the reflector surface 106 is omitted in some of the drawing figures.

Illustrative Support Structure

In the stowed condition, the hoop assembly can be sufficiently reduced in size such that it may fit within a compact space (e.g., a compartment of a spacecraft or on the side of a spacecraft). The hoop assembly 102 can have various configurations and sizes depending on the system requirements. In some scenarios the hoop assembly 102 can define a circular structure as shown in FIG. 1 and in other scenarios the hoop assembly can define an elliptical structure. Advantageously, the hoop assembly 102 can be configured to be a self-deploying system.

The exact configuration of the hoop assembly 102 is not critical. Any hoop assembly can be employed provided that it is capable of facilitating stowage and deployment of the reflector surface 106 as described herein. Accordingly, it should be understood that the particular hoop assembly shown and described herein is presented merely as one possible example of a hoop assembly which can be used to stow and deploy a folded CNT reflector surface.

In the example provided, the hoop assembly 102 is comprised of a plurality of link elements which are disposed about a central, longitudinal axis 108. The link elements can comprise two basic types which are sometimes referred to herein as a first link element 110, and a second link element 112. The link elements are elongated rigid structures which extend between hinge members 114, 116 disposed on opposing ends of the link elements. For example, in some scenarios the link elements can be comprised of elongated rigid tubular structures formed of a rigid lightweight material. Exemplary materials which can be used for this purpose include metallic or a Carbon Fiber Reinforced Polymer (CFRP) composite material.

Figure 4A:
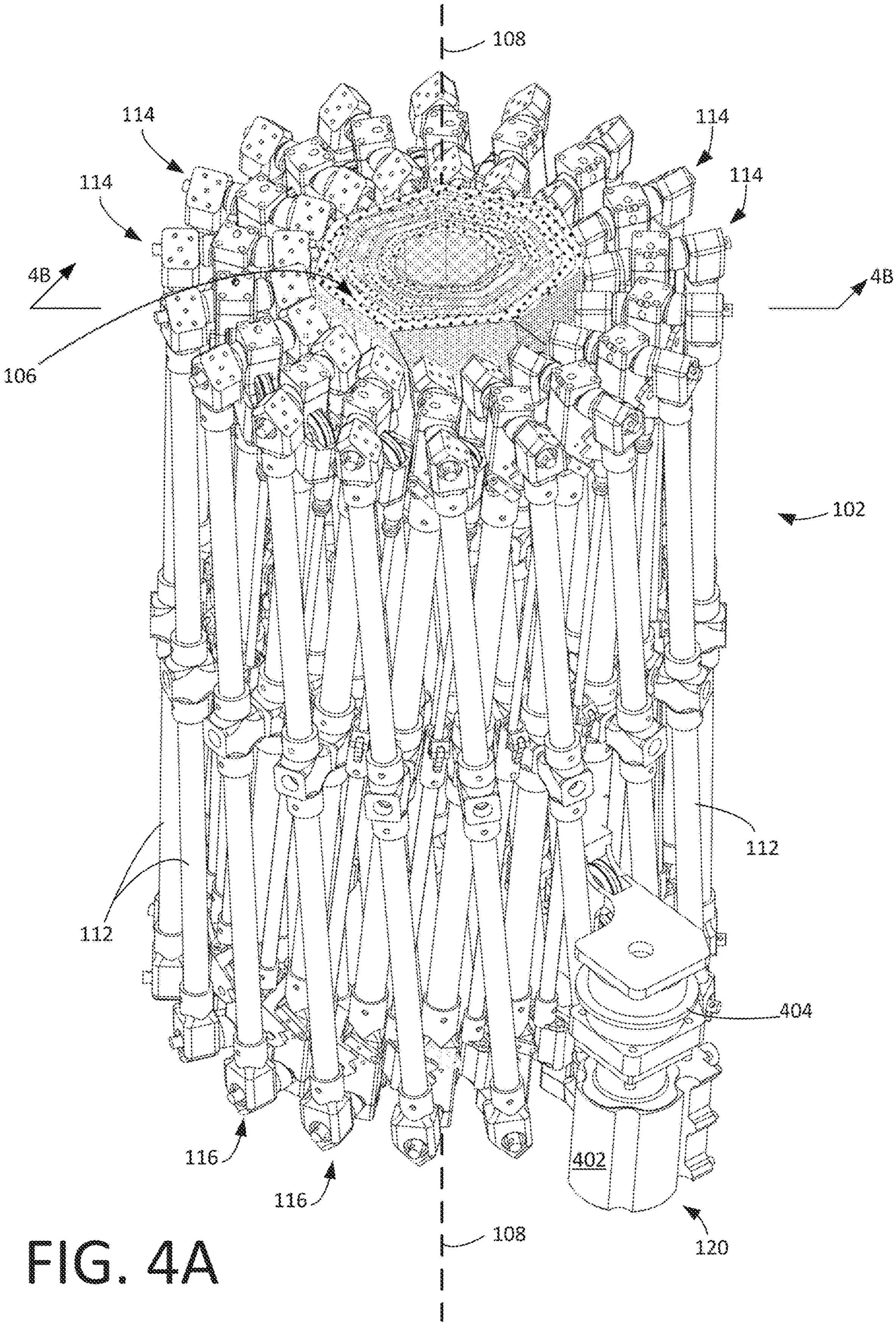
FIG. 4A is a perspective view of the hoop assembly and reflector surface in a collapsed or stowed condition.
Figure 4B:
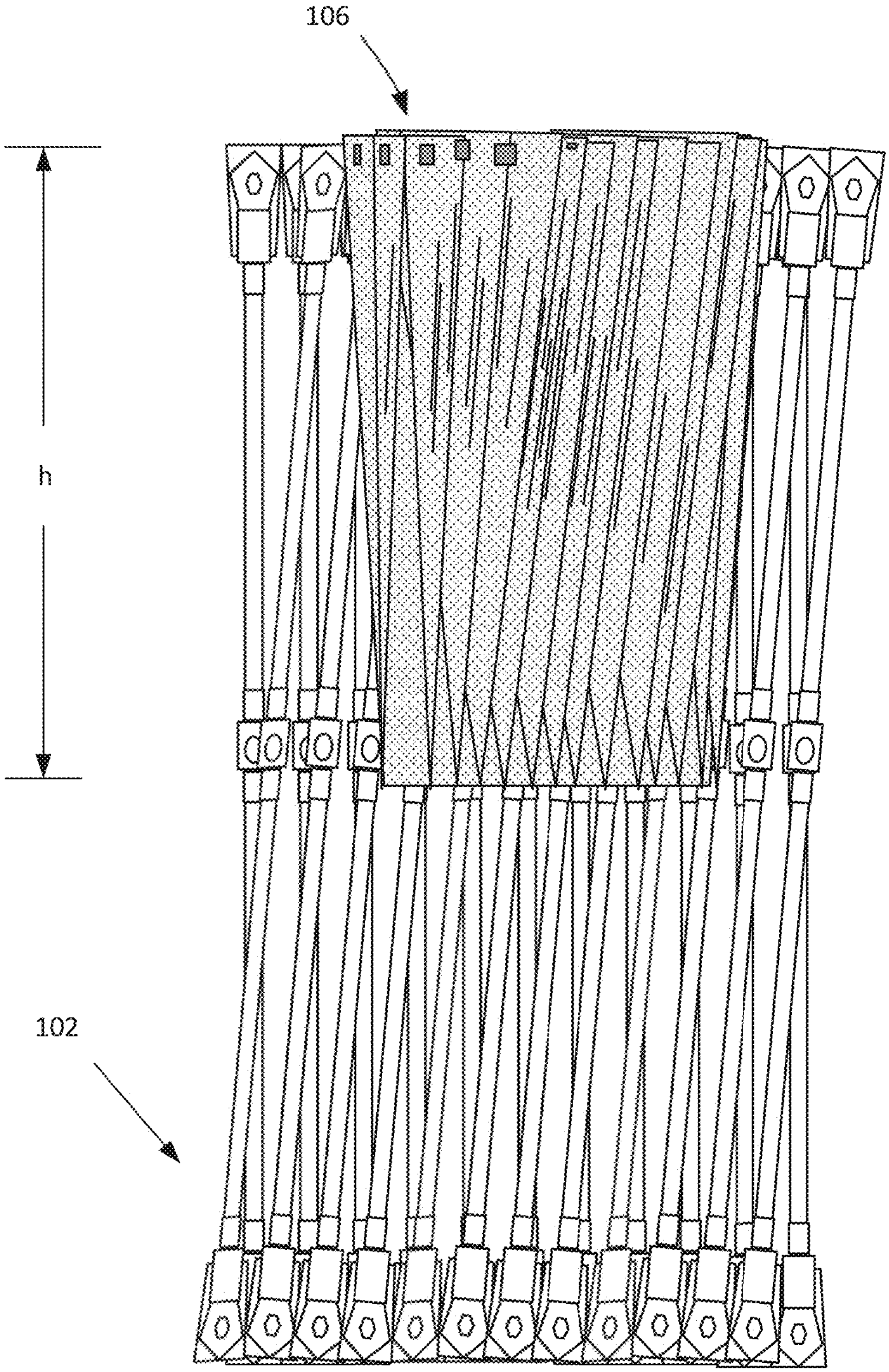
FIG. 4B is a cross-sectional view of the hoop assembly and reflector surface in FIG. 4A taken along line 4B-4B.

As may be observed in FIGS. 4A and 4B, the arrangement of the hoop assembly is such that the hoop can have a collapsed condition wherein the first and second link elements extend substantially parallel to each other, and an expanded condition wherein the link elements define a circumferential hoop around a central axis. In some scenarios, the substantially parallel condition referred to herein can include a condition in which the axial length of the first and second link elements each form an angle of less than about 5 to 10 degrees relative to the central axis 108 of the hoop assembly. Further, it can be observed by comparing FIG. 2 and FIG. 4A that a circumference defined by the hoop assembly 102 in the expanded condition can be much greater as compared to the circumference defined by the hoop in the collapsed condition.

The reflector surface 106 is advantageously formed of a thin highly flexible sheet or web comprised of a resin-stabilized CNT material. The CNT material is conductive and highly reflective of radio frequency signals. Due to the highly flexible nature of the resin stabilized CNT material, it is easily foldable. Consequently, the reflector surface can be compactly stowed by applying a predetermined intricate folding pattern. For example, in some scenarios the CNT sheet material can be stored in folded condition within the circumference of the hoop assembly when folded or collapsed for stowage.

The resin stabilized CNT material is advantageously secured at attachment points 107 along its periphery to the hoop assembly 102. The material is also attached at various locations using battens to shaping/support cords 109 disposed within the periphery of the hoop assembly. Consequently, when the hoop assembly is in the expanded condition, the reflector surface is expanded to a shape that is intended to concentrate RF energy in a desired pattern. For example, the reflector surface can be controlled so as to form a parabolic surface when the hoop assembly is in the expanded or deployed condition.

It may be noted that in order to shape the reflector 106 into a parabolic surface (or other reflecting surface shape), the hoop assembly 102 will necessarily need to have a thickness t which extends in the longitudinal direction aligned with the central axis 108. As such, the hoop assembly 102 will include structural elements which extend some predetermined distance out of a plane defined by the peripheral edge of the reflector surface. This distance is usually greater than the depth of the reflector as measured along the axis 108. It will be appreciated the hoop assembly as described herein must also have a degree of bending stiffness to allow the reflector to conform to the required shape. For a system using symmetric optics where RF energy is focused along the longitudinal axis of the reflector 108, the structure 102 will be circular when deployed. For systems requiring an 'offset' configuration where the RF energy is focused on a line parallel to the longitudinal axis 108 but located outside the perimeter of the hoop, the structure 102 is elliptical in shape.

Figure 3:
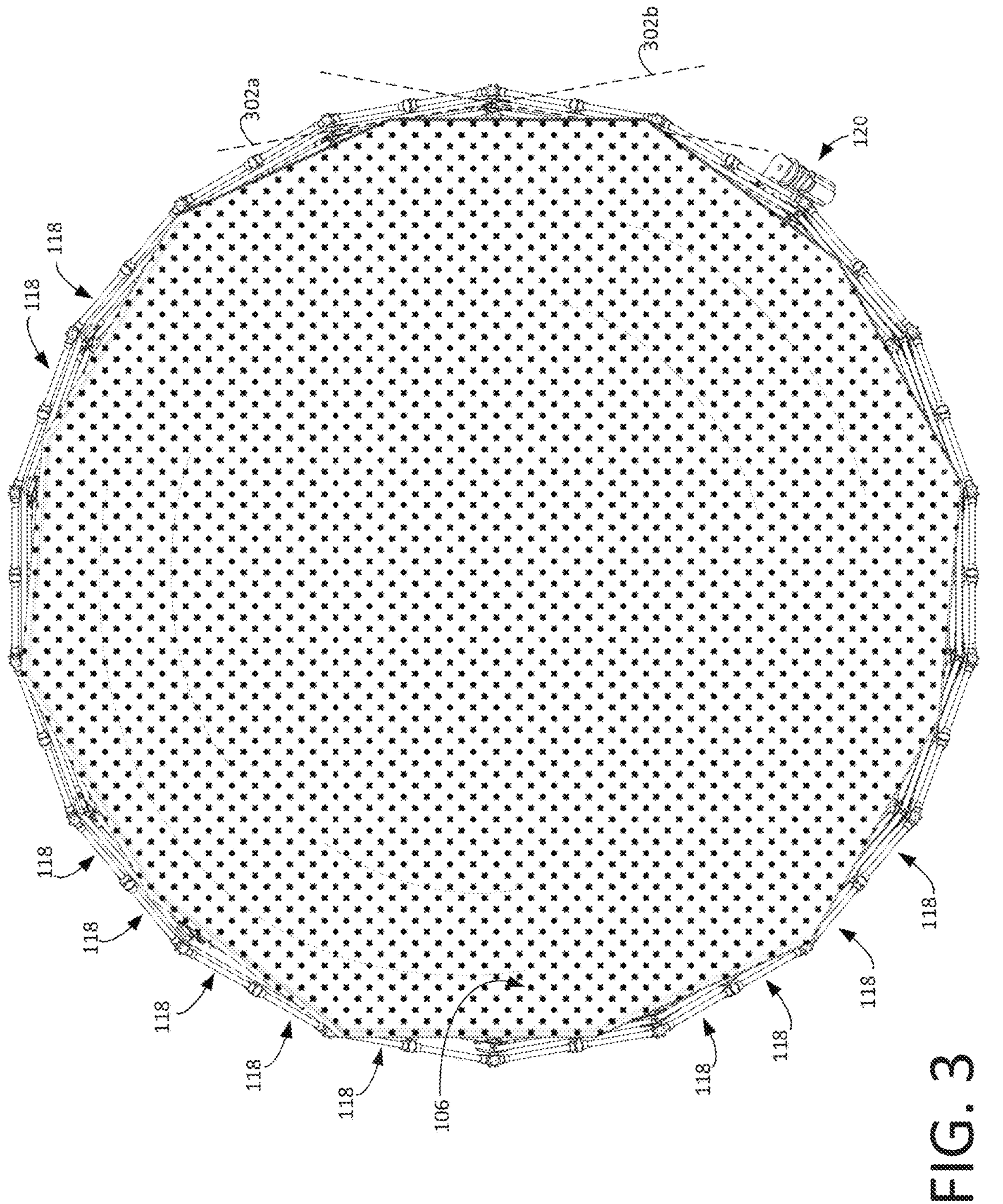
FIG. 3 is a top view of the deployed hoop assembly.

Referring now to FIG. 3 it can be observed that when the hoop assembly 102 is in the expanded condition, the arrangement of the link elements 110, 112 is such that the assembly will define a plurality of N sides 118, where N is an integer. The actual value of N can vary depending on a various design considerations. Usually for reasons of symmetry, it is advantageous to select a value for N that is evenly divisible by 2. The number of sides can be advantageously selected by a designer for each application to optimize packaging and weight.

Figure 5:
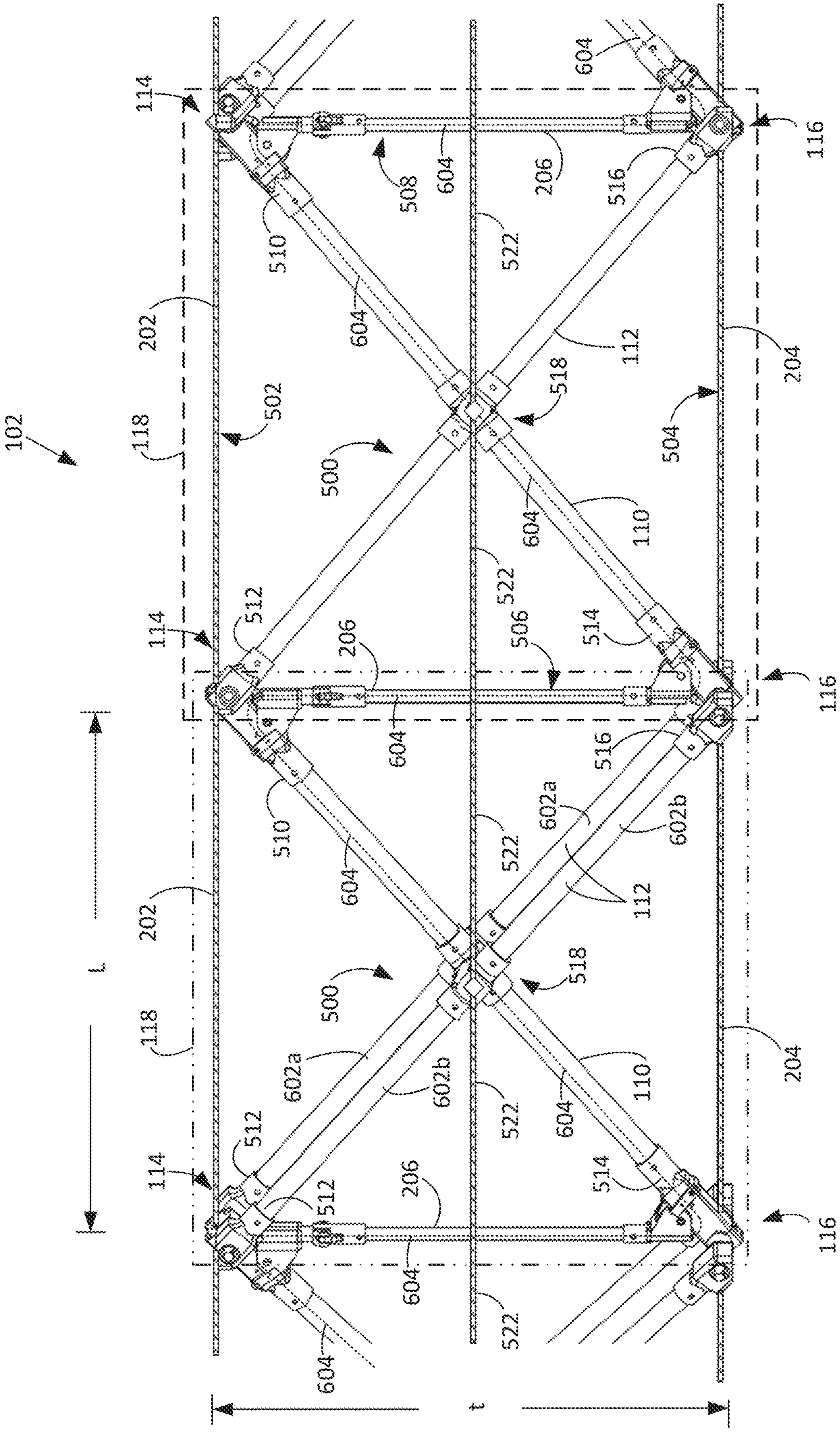
FIG. 5 is a side view of a portion of the deployed hoop assembly which is enlarged to show certain details.

As shown in FIG. 5, the arrangement of link elements allows each of the N sides 118 to be understood as defining a rectangle or rectangular shape. As such, the sides 118 are also sometimes referred to herein as rectangular sides. Each rectangular side is comprised of a top 502, a bottom 504 and two opposing, vertical edges 506, 508 which generally define the outer periphery or edges of each rectangular side. As used herein, the word "vertical" is used to indicate a direction which is generally aligned with the direction of the central, longitudinal axis 108.

In some scenarios, the top and bottom edges 502, 504 can be aligned with a top cord 202 and a bottom cord 204 when the hoop assembly is in a deployed condition. Likewise, the two opposing vertical edges 506, 508 can be aligned with aligned with side edge tension elements 206. Such a scenario is illustrated in FIG. 3 where the elongated length of the top and bottom cords correspond to the top and bottom edges 502, 504, and the vertical side edges correspond to the side tension elements 506, 508. But in some scenarios, these various edges may not correspond to these structural elements and may instead correspond to imaginary lines drawn between hinge members 114, 116 disposed on opposing ends of the link elements. In some scenarios, the top, bottom and two opposing edges can all be of the same length such that the rectangular shape is a square. However, in other scenarios the rectangular side can have a top and bottom which are of a length different from the two vertical edges.

As may be observed in FIGS. 3 and 5 the N sides are disposed adjacently, edge to edge, and extend circumferentially to define a periphery of the hoop assembly 102. Further, the opposing edges 506, 508 of each side can advantageously extend substantially along the full axial depth or thickness t of the hoop assembly 102 in a direction aligned with the hoop longitudinal axis 108. As such, a top 502 of each side will be substantially aligned along a top plane of the hoop assembly which extends in directions orthogonal to the hoop longitudinal axis. Similarly, a bottom edge 504 of each side will be substantially aligned along a bottom plane of the hoop assembly 102 which extends in directions orthogonal to the hoop longitudinal axis. When the hoop assembly is expanded, the bottom plane is spaced a distance t from the top plane.

Each of the N sides is defined in part by an X-member 500 which is comprised of a first and second link element 110, 112. As shown in FIG. 5, the first and second link elements are disposed in a crossed configuration. More particularly, the first and second link elements can be respectively disposed on opposing diagonals of the rectangle which defines each side. As such, each of the first and second link elements 110, 112 can respectively include a top end 510, 512 which extends substantially to a top corner defined by the top 502 and one side 506, 508 of the side. Each of the first and second link elements can also respectively include a bottom end 514, 516 which extends substantially to a bottom corner of the rectangle defined by the bottom 504 and sides 506, 508 of the side.

A pivot member 518 is connected at a pivot point of the first and second link elements. The pivot point is advantageously located intermediate of the two opposing ends of each link element. For example, the pivot point is advantageously disposed at approximately equal distance from the opposing ends of the first link element, and at approximately equal distance from the opposing ends of the second link element. As such, the pivot point can located approximately at a midpoint of each element.

Figure 6:
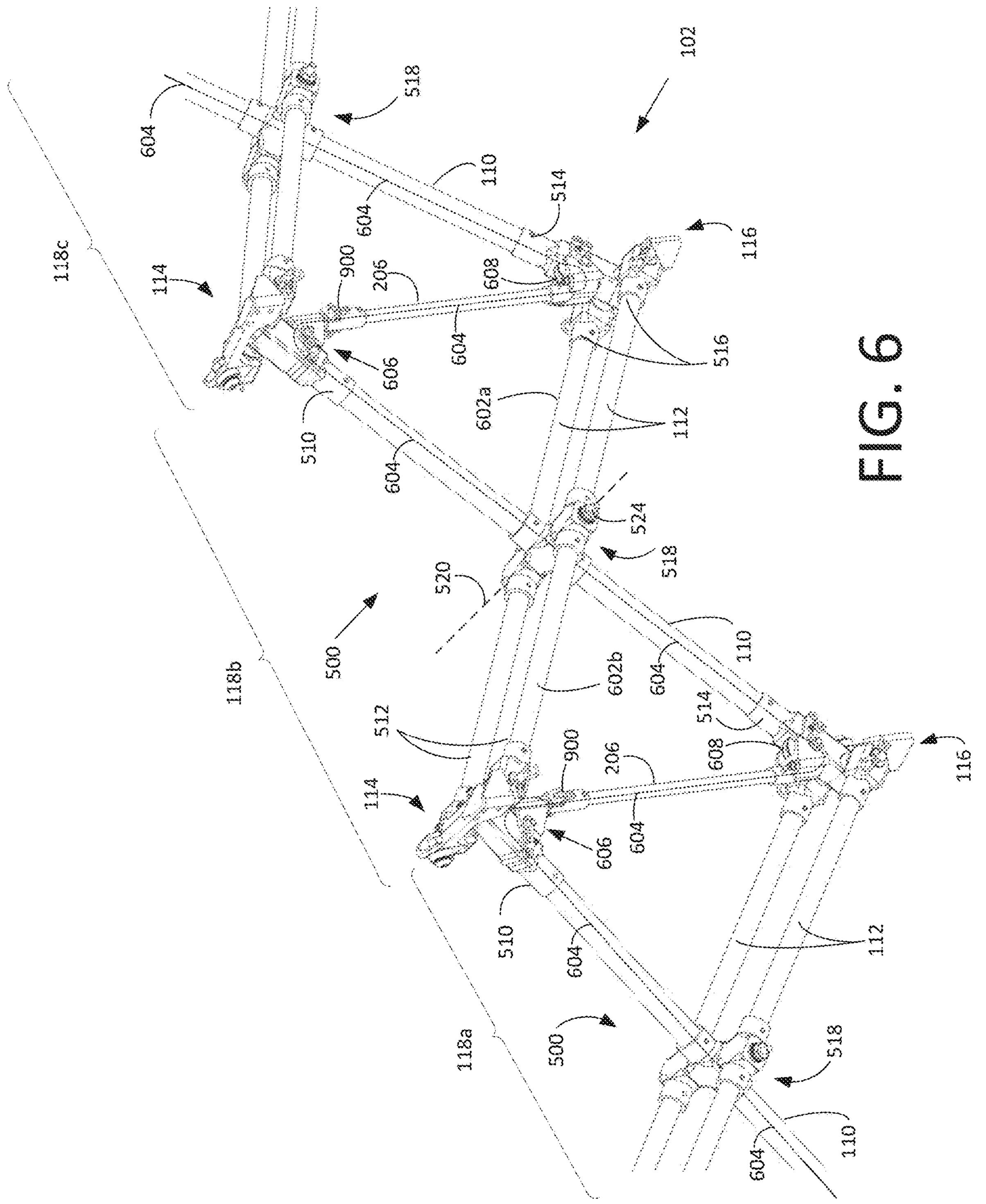
FIG. 6 is a perspective view of a portion of the deployed hoop assembly which is enlarged to show certain details.

The pivot member 518 is configured to facilitate pivot motion of the first link element 110 relative to the second link element 112 about a pivot axis 520 in FIG. 6 when the hoop assembly transitions between the collapsed condition and the expanded condition. As such, the first and second link elements which form the X-member can move in a manner which mimics the operation of a pair of scissors. According to one aspect, the pivot axis 520 of the X-member can be approximately aligned with a radial axis 300 (as shown in FIG. 3) of the larger overall hoop assembly, where the radial axis extends orthogonally from the central axis. The exact configuration of the pivot member 518 is not critical provided that it facilitate the pivot or scissor motion described herein. In some scenarios, the pivot member can be a shaft or an axle 524 on which one or both of the first and second link elements 110, 112 are journaled to facilitate the pivot motion described herein. As such, one or both of the first and second link elements 110, 112 can also include a bearing surface which facilitates rotation of the link member on the pivot member.

The hinge members 114, 116, which are sometimes referred to herein as hinges, are disposed at opposing ends of the first and second link elements 110, 112 and connect adjoining ones of the X-members 500 at the top and bottom corners associated with each side. As shown in FIGS. 5 and 6, the first link element 110 of each X-member 500 is connected at its top end 510 to a second link element 112 of an X-member associated with a first adjacent side. The same first link element 110 is connected at its bottom end 516 to the second link element 112 of a second one of the X-members associated with a second adjacent side. This arrangement allows the ends of each link member to pivot relative to the link elements comprising an adjacent side so that the scissor motion of each X-member as described herein can be facilitated.

As is best shown in FIGS. 5 and 6, the second link element 112 of each X-member 500 is advantageously comprised of a plurality of elongated structural members 602*a*, 602*b*. In some scenarios, this plurality of elongated structural members can extend in parallel with each other as shown. A first one of the elongated structural members 602*a* advantageously extends on an inner side of the first link element 110 which is closest to the central axis 108 of the hoop assembly 102. The second one of the elongated structural members 602*b* can extend on an outer side of the first link element 110 which is furthest from the central axis of the hoop. The pivot member 518 is configured so that it will facilitate pivot motion of each of the plurality of elongated structural members 602*a*, 602*b* relative to the first link element such that the two members can pivot together about the pivot axis 520.

In a scenario disclosed herein, the plurality of elongated structural members 602*a*, 602*b* can be connected to a common or shared hinge 114 at a top end 512 of the second link element 112, and a common or shared hinge 116 at a bottom end 516 of the second link element. As such, the plurality of elongated structural members 602*a*, 602*b* can share a common top hinge 114 and a common bottom hinge 116. As shown in FIG. 6, the common top hinge 114 in a side 118*b* is connected to a top end 510 of the first link element 110 comprising the X-member in a first adjacent side 118*a*. The shared or common bottom hinge 116 is connected to a bottom end 514 of the first link element 110 comprising the X-member in a second adjacent side 118*c*.

In a hoop assembly as described herein adjacent ones of the sides 118 will necessarily be aligned in different planes. This concept is best understood with reference to FIG. 3 which shows that adjacent sides 118 will be aligned in different planes 302*a*, 302*b*. Accordingly, the arrangement of the hinges used to connect the X-members 500 is advantageously selected so as to minimize any potential binding of the hoop assembly 102 during transitions between its stowed condition and deployed condition. Various arrangements for hinge members 114, 116 can be used to facilitate this purpose.

Figure 2:
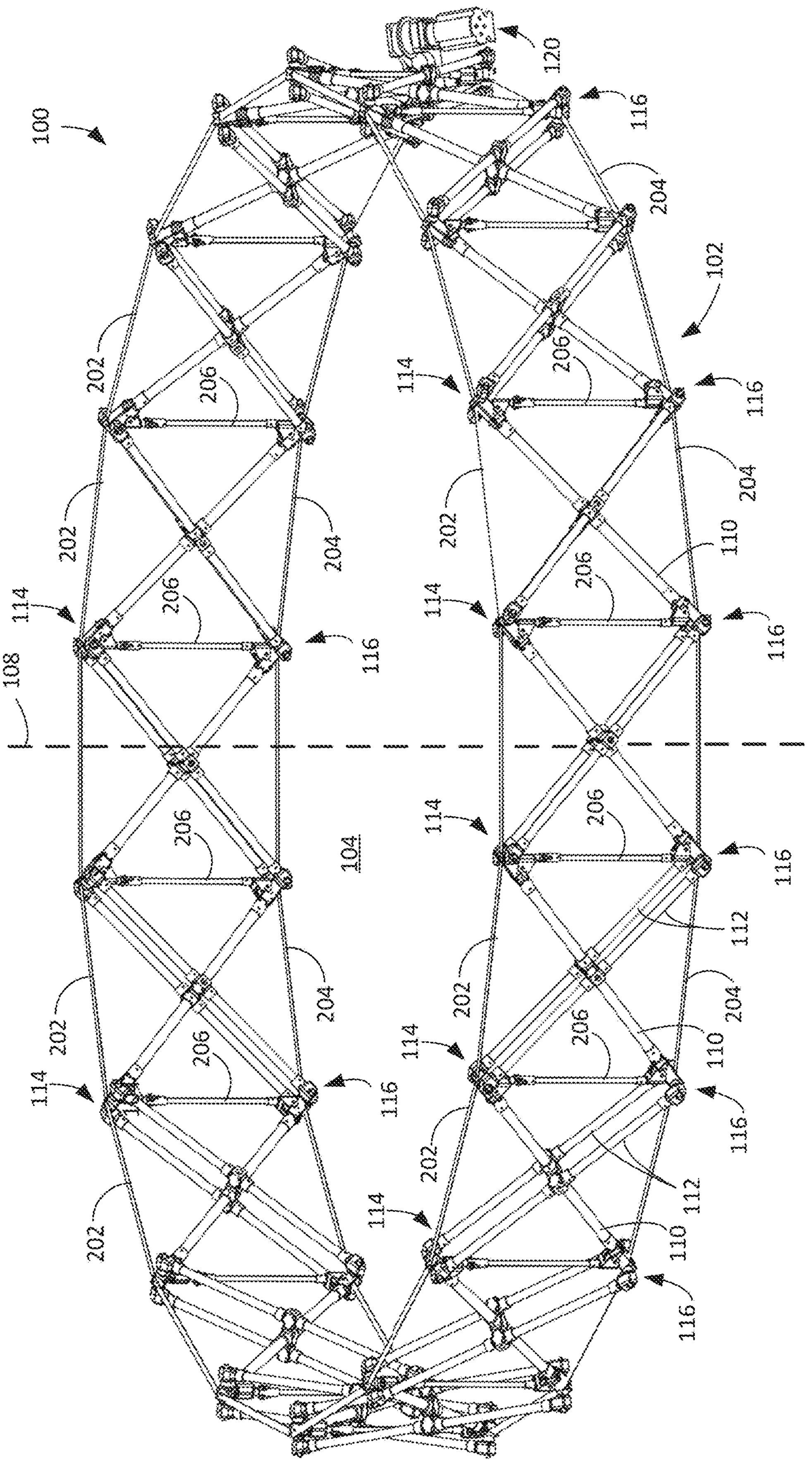
FIG. 2 is a perspective view of the deployed hoop assembly.

Each rectangular side 118 comprising the hoop assembly is further defined by a plurality of tension elements (FIG. 5) which extend around the periphery of the side and apply tension between opposing ends of the first and second link elements in directions aligned with the top, bottom and two opposing edges. More particularly, as shown in FIGS. 2 and 5, the tension elements include a top cord 202 which extends along the top of the side between top ends 510, 512 of the first and second link elements, and a bottom cord 204 which extends along the bottom of the side between bottom ends 514, 516 of the first and second link elements. In a scenario disclosed herein, the top cord 202 is substantially aligned with the top plane defined by the hoop assembly and the bottom cord is substantially aligned with the bottom plane defined by the hoop assembly. In such a scenario, the top cord for each side can be secured to securing hardware (not shown) on opposing ones of the hinge members 114, and the bottom cord for each side can be secured to securing hardware (not shown) on opposing ones of the hinge members 116. The top and bottom cords are tension-only elements, meaning that they are configured exclusively for applying tension between the opposing ends of the link elements. As such the top and bottom cord 202, 204 can be flexible tensile elements, such as cable, rope or tape.

To control the deployed position of each side of the expanded hoop, it is important that the top and bottom cords 202, 204 be stiff elements, meaning that they are highly resistant to elastic deformation when under tension. While slack in the collapsed state, these elements are selected to quickly tension at their expanded length. As such, they act as a 'hard-stop' to limit further hoop expansion by restricting the distance between hinges 114 at the top and 116 at the bottom. To effect 'hard-stop' behavior in these elements, the amount of stretch between the slack state and tension state should be small. This high degree of control over hinge position will in turn facilitate the precision of the attached surface 104 in FIG. 1.

In some scenarios, a separate top cord 202 can be provided between the link elements 110, 112 comprising each side 118. Similarly, each side 118 can be comprised of a separate bottom cord 204 which extends between the bottom ends of the first and second link elements. But in other scenarios it can be advantageous to use a single common top cord 202 which extends in a loop around the entire hoop assembly. Such a top cord 202 can then be secured or tied off at intervals at or near the top ends 510, 512 of the first and second link elements 110, 112. For example, the top cord 202 can be secured at intervals to securing hardware associated with each of the top hinge members 114. Consequently a portion or segment of the overall length of the single common top cord loop will define a top tension element for a particular side. A similar arrangement can be utilized for the bottom cord 204. Since the top and bottom cord have significant stiffness (resistance to elastic deformation) as explained above and are attached to opposing hinge elements at or near the top and bottom of each X-member, their length Ld will necessarily limit the maximum deployed or expanded rotation of the first and second link elements 110, 112 about a pivot axis 524.

Each side 118 is further defined by opposing vertical edge tension elements 206 which extend respectively along the two opposing edges of the side. In a scenario disclosed herein, the edge tension elements 206 can extend respectively along the two opposing vertical edges of each side. The edge tension elements 206 are configured for applying tension between the opposing top and bottom ends of the link elements 512, 514 and 510, 516 when they are in a latched condition.

Referring once again to FIGS. 5 and 6, the hoop assembly also includes at least one deployment cable 604. The deployment cable 604 can be a continuous cord which extends around the perimeter of the hoop assembly 102 to drive transition of the hoop assembly from the collapsed condition to the expanded condition. The deployment cable 604 is a flexible tensile element, such as cable, rope or tape. Portions of the deployment cable 604 extend along the two opposing vertical edges 506, 508 of each side. Under some conditions these portions of the deployment cable can also be understood to function as edge tension elements. More particularly, these portions of the deployment cable 604 will function as the edge tension elements when the edge tension elements 206 are in an unlatched state. In some scenarios, these portions of the deployment cable can be disposed within a central bore of each edge tension element 206 such that the deployment cable 604 and the edge tension element 206 are substantially coaxial.

In each side 118, the control cable extends diagonally between the two opposing edges 506, 508, along the length of the first link element 110. For example, the deployment cable 604 in such scenarios can extend through a bore formed in the first link element 110, where the bore is aligned with the elongated length of the first link element. Of course, other arrangements are also possible and it is not essential that the deployment cable extend through a bore of the first link element. In some scenarios, the control cable could alternatively extend adjacent to the first link element through guide elements (not shown).

Cable guide elements are advantageously provided to transition an alignment of the deployment cable from directions aligned with the opposing edges 506, 508 of each side, to a diagonal direction aligned with the first link element 110. In a scenario disclosed herein, a top guide element 606 and bottom guide element 608 are respectively disposed at the top and bottom ends of the first link element 119. The cable guide elements can be simple structural elements formed of a low friction guiding surface on which the deployment cable can slide. However, it can be advantageous to instead select the cable guide elements to comprise a pulley that is designed to support movement and change of direction of a taught cord or cable. Details of a pulley type of cable guide element 606 can be seen in FIG. 10. Cable guide element 608 can have a similar configuration.

As shown in the FIGS. 2, 3 and 4A, a deployment cable actuator 120 can comprise a motor 402 and a drum assembly 404. The deployment cable is wound about the drum, and the motor controls rotation of the drum. In some scenarios, both opposing ends of the deployment cable can be wrapped around the drum to facilitate winding of the cable. With the foregoing arrangement, the length of the deployment cable 604 extending around the perimeter of the hoop assembly (extended length) can be selectively varied by controlling the amount of cord wound about the drum. Decreasing the extended length of the deployment cable around the periphery of the hoop assembly will cause the hoop assembly to transition from a collapsed condition shown in FIG. 4 to an expanded condition shown in FIGS. 1 and 2. More particularly, as an increasing portion of the deployment cable is wound on the drum, the extended length of the cord will necessarily shorten and the opposing edges 506, 508 of each side 118 forming the hoop assembly will decrease in length. The foregoing action will result in expanding the radius of the hoop assembly until it reaches its deployed condition.

Illustrative Folding Pattern

In FIGS. 4A and 4B, the reflector surface 106 is shown in its stowed configuration within the hoop assembly 102. FIG. 4B shows a cross-sectional view of the assembly in FIG. 4A, taken along line 4B-4B. In FIGS. 4A and 4B, the cords and related structure that attach the peripheral edge and other portions of the reflector surface 106 to points on the hoop assembly have been omitted for greater clarity.

It can be observed in FIGS. 4A and 4B that the reflector surface 106 when in its stowed configuration is intricately folded in accordance with a predetermined pattern. The folding pattern is advantageously selected to permit automatic expansion of reflector surface 106 in the radial direction (relative to axis 108) when the hoop assembly (to which the reflector is attached) transitions from a compact stowed configuration to an extended or deployed configuration.

Figure 7:
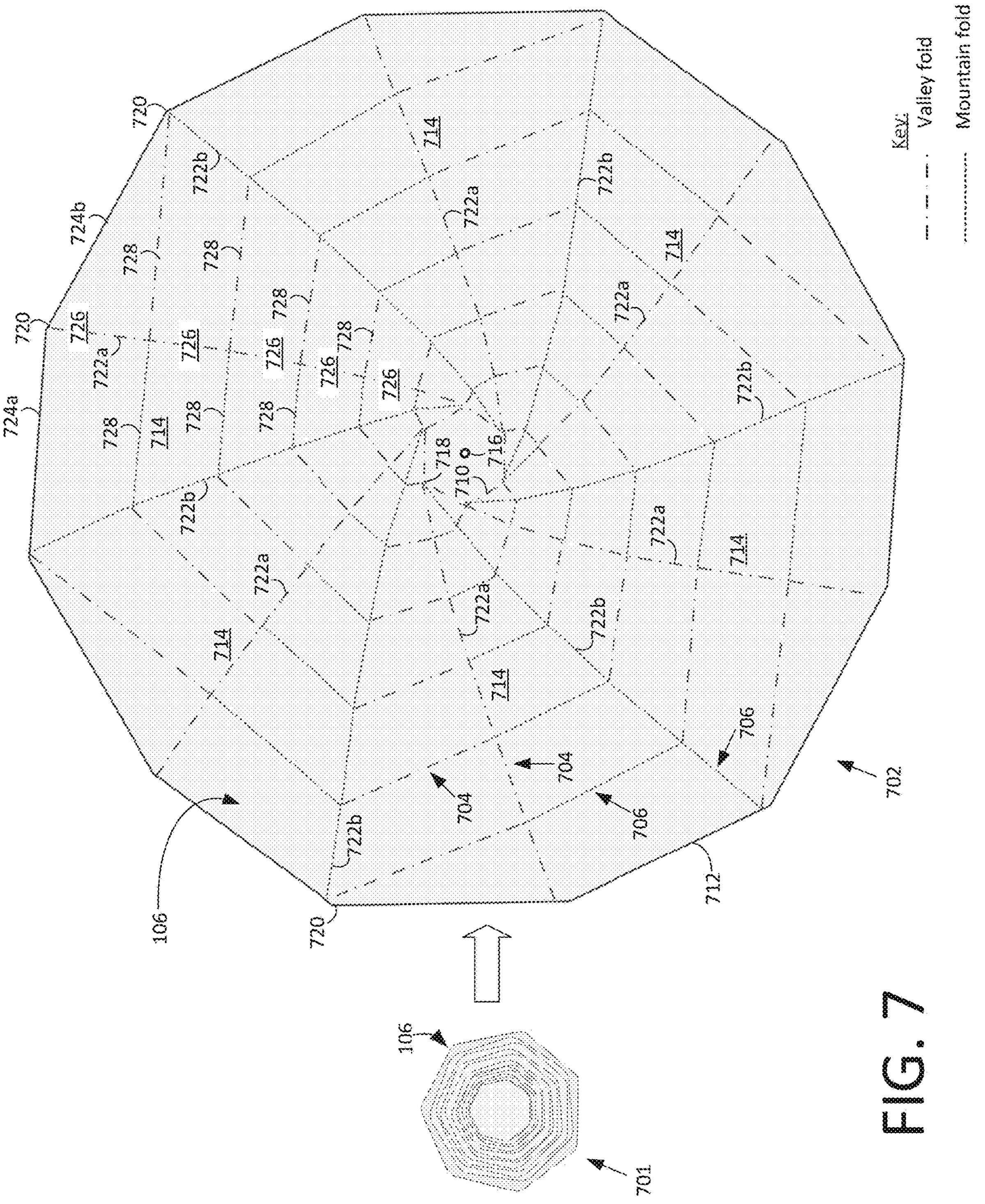
FIG. 7 is a drawing which shows how the reflector surface can extend from a compact folded state to a fully unfolded state.

Shown in FIG. 7 is a simplified example of a predetermined intricate folding pattern which can be used to facilitate a transition of reflector surface 106 from folded or stowed configuration 701 to a fully deployed or extended configuration 702. Each of the dashed lines in FIG. 7 represents a fold line of the reflector when the reflector surface when in its folded or stowed configuration. In the embodiment shown, there are two types of folds used. The two types of folds include valley folds 704 (which define valley fold lines) and mountain folds 706 (which define mountain fold lines). A valley fold is a fold of the CNT sheet material that forms a trench. In contrast, a mountain fold is a fold of the CNT sheet material that forms a ridge.

In the example shown, the predetermined intricate folding pattern is comprised of three primary elements. These elements include an inner polygon 710, an outer polygon 712, and a plurality of wedges 714. The inner polygon and the outer polygon have a common center point 716. The inner polygon will have a predetermined number of points or corners 718 defined by the value n, whereas the outer polygon will have a predetermined number of points or corners 720 defined by the value 2n. In the simplified example shown in FIG. 7, the inner polygon is a hexagon having six points (n=6), whereas the outer polygon is a regular dodecagon having 12 sides and 12 points (n=12).

Each wedge 714 includes a plurality of wedge fold lines 722*a*, 722*b* which extend in a direction away from points 718 of the inner polygon to points 720 of the outer polygon. More particularly, two wedge fold lines 722*a*, 722*b* originate from every point of the inner polygon to define a vertex. In each case, a first type of the two wedge fold lines 722*a* will be a valley fold line, and a second of the two fold lines 722*b* will be a mountain type fold line. Each of these two wedge fold lines respectively extends along a different path to a different one of two points of the outer polygon. A wedge 714 is defined by two adjacent ones of the second type wedge fold line 722*b* and two adjoining sides 724*a*, 724*b* of the outer polygon which connect end points of the two wedge fold lines. It can be observed in FIG. 7 that these second type of wedge fold lines respectively extend in a direction away from adjacent corners of the inner polygon 710 to alternate corners 720 of the outer polygon.

Each wedge 714 includes a plurality of segments 726. The segments are defined by a plurality of cross-folds which establish cross-fold lines 728. The cross-fold lines within a particular wedge are equally spaced and parallel to one another so as to extend linearly between opposing mountain type wedge fold lines. The cross-fold lines are advantageously spaced equidistant from each other along the length of the wedge fold lines 722*b* between the inner and outer polygons. The spacing or distance between adjacent cross-fold lines will determine a height h of the reflector surface 106 when it its stowed or folded configuration. The first type of wedge fold lines 722*a* divide each wedge into two approximately equal portions along a direction extending from the center of the inner polygon. Consequently, it may be observed that within each wedge 714 a particular parallel cross-fold line 728 will transition from a mountain type fold line to a valley type fold line when it crosses or intersects the first type wedge fold line 722*a*. As may be observed in FIG. 7, the cross-fold lines 728 of each segment 714 extend in a direction which is transverse to the cross-fold lines 728 of an adjacent segment.

Application of the folding pattern to the CNT material results in the stowed configuration 701, whereas unfolding of the CNT sheet material results in the extended or deployed configuration 702. According to one aspect of a solution disclosed herein, the unfolding operation of the CNT material can be performed automatically. For example, a peripheral edge of the reflector surface can be advantageously secured at attachment points 107 along its periphery to the hoop assembly 102. When the hoop is radially expanded, a tension force is applied to edges of the reflector surface which result in an unfolding operation of the reflector surface.

It should be understood that the folding pattern shown in FIG. 7 is merely one possible example of a predetermined intricate folding pattern which may be used to facilitate the stowed or folded configuration of a CNT sheet reflector surface. The intricate folding pattern shown in FIG. 7 is well suited for an expandable hoop type of support structure. However, the solution is not intended to be limited to the particular pattern or support structure shown. Other intricate folding patterns can also be used provided that the pattern facilitates a reduction of the CNT sheet material to a compact stowed configuration which fits within the support assembly, and allows for automatic deployment of the reflector surface when the support assembly is extended for deployment. In this regard it will be understood that a different predetermined intricate folding pattern may be used to accommodate different types of reflector support structures.

Illustrative CNT Sheet

The CNT material can include, but is not limited to, a sheet of CNT material which has a mesh pattern laser cut therein and/or a mesh material formed of a CNT yarn. The CNT material can, for example, (i) comprise a plurality of carbon nano-tubes, (ii) is reflective of radio waves, (iii) has a solar absorptivity to hemispherical emissivity ratio ($\alpha_{solar}/\varepsilon_H$ ratio) that is equal to or less than 2, and/or (iv) has a CTE that is equal to zero plus or minus 0.5 ppm/C°.

In some scenarios, the CNT yarn includes, but is not limited to, a Miralon® yarn available from Nanocomp Technologies, Inc. of Merrimack, New Hampshire. The CNT yarn is strong, lightweight, and flexible. The CNT yarn advantageously has a low solar absorptivity to hemispherical emissivity ratio (e.g., $\alpha_{solar}/\varepsilon_H$=2). In some scenarios, the low $\alpha_{solar}/\varepsilon_H$ ratio is less than 25% of the $\alpha_{solar}/\varepsilon_H$ ratio of a gold plated tungsten or molybdenum wire. The CNT yarn also has a low CTE that is more than an order of magnitude less than a CTE of a gold plated tungsten or molybdenum wire. For example, the CNT yarn has a CTE equal to −0.3 ppm/C°. All of these features of the CNT yarn are desirable in antenna applications and/or space based applications.

The CNT sheet material has many advantages as compared to conventional mesh materials formed of gold plated molybdenum wire. The CNT sheets can have an approximate thickness which can be between 0.1 mil and 10 mil. For example a CNT sheet thickness in some scenarios can be about 1 mil. A significant advantage of a reflector formed of CNT sheet material is that it can have an order of magnitude less through-thickness variation as compared to conventional woven Au—Mo wire mesh. To form a properly sized and shaped reflector surface, the CNT sheets can be bonded together to form larger sheets which support large reflector sizes. Further, CNT sheets can be creased/folded to facilitate an intricate folding pattern which allows for compact stowage and automatic deployment of the reflector surface.

In some scenarios, the CNT sheet material is comprised of a CNT mesh formed by laser cutting a mesh pattern in a sheet of CNT material. In other scenarios, the CNT mesh material is formed by knitting or weaving a CNT yarn. Laser cutting and the knittability/weavability of CNT yarns allows for a relatively wide range of possible openings per inch (e.g., 10-100 openings per inch) in a mesh material. Additionally, the laser cutting and CNT yarn provides mesh materials with areal densities that are less than ten percent of the areal density of a mesh material formed using the gold plated tungsten or molybdenum wire with a diameter equal to the diameter of the CNT yarn.

The CNT mesh material can include, but is not limited to, a single layer of mesh. The mesh material may have a number of openings per inch selected based on the frequency of the EM energy to be reflected by the mesh antenna 100 (e.g., 10-100 openings per inch). In the CNT yarn scenarios, the mesh material comprises a knitted mesh material formed of a series of interlocking loops of CNT yarn. Notably, the present solution is not limited to knitted mesh materials. In other applications, the mesh material is a weave material rather than a knitted material. The weave material comprises a first set of filaments intertwined with a second set of filaments. Interstitial spaces or openings may be provided between the filaments.

In some scenarios, the knitted mesh material of the antenna reflector 102 comprises a tricot type knit configuration. The present solution is not limited in this regard. Other types of knit configurations can be used herein instead of the tricot knit configuration. The tricot type knitted material may have an opening count of 10-100 per inch.

Each opening is defined by multiple loops of CNT yarn. In some scenarios, the tricot type knitted material has an areal density that is less than ten percent of an areal density of a tricot type knitted mesh material formed using a gold plated tungsten or molybdenum wire with a diameter equal to the diameter of the CNT yarn.

In some scenarios, a CNT reflector surface 106 can be formed by cutting the CNT mesh material into a plurality of wedge shaped pieces; and bonding together the wedge shaped pieces using a resin film adhesive (e.g., cyanate ester resin film) to form the antenna reflector with a three dimensional contoured surface. The wedge shaped pieces may be prevented from wrinkling or otherwise experiencing surface abnormalities during the bonding. In some scenarios, adjacent ones of the wedge shaped pieces of CNT mesh material overlap each other. Additionally or alternatively, the CNT material can have a laser cut mesh pattern formed therein.

The reflector surface 106 formed of the CNT sheet material in some scenarios can be pieced together so as to have overall a concave or parabolic shape. A resulting three dimensional contoured surface of the antenna reflector is smooth or otherwise absent of surface abnormalities. Forming the CNT sheet reflector with a parabolic shape can involve several steps. A release agent can be cut into a plurality of wedge shaped pieces of CNT sheet material. Optionally the release agent can be disposed on a three dimensional contour surface of a mold structure. Thereafter, the plurality of wedge shaped pieces of CNT mesh material can be positioned on the three dimensional contour surface of a mold structure and/or the release agent. Thereafter, a resin film adhesive can be applied to the plurality of wedge-shaped pieces of CNT mesh material.

The wedge shaped pieces of CNT mesh material are bonded together by: applying heat and pressure to the resin film adhesive and the plurality of wedge shaped pieces of CNT mesh material; and allowing the resin film adhesive to flow into the CNT mesh material and cure so as to stiffen the CNT mesh material, whereby the antenna reflector is formed. The pressure may be applied using at least one of a caul structure and a vacuum bag.

In those or other scenarios, the wedge shaped pieces of CNT mesh material are bonded together by: applying pressure to the wedge shaped pieces and the resin film adhesive; applying heat to (i) increase a temperature of the wedge shaped pieces from a first temperature to a second temperature, and (ii) reduce a viscosity of the resin film adhesive; waiting a first period of time to allow the resin film adhesive to flow into the CNT mesh material; discontinuing application of the pressure to the wedge shaped pieces and the resin film adhesive; applying heat to (i) increase the temperature of the wedge shaped pieces from the second temperature to a third temperature, and (ii) allow a chemical reaction to occur between the resin film adhesive and the wedge shaped pieces; waiting a second period of time to allow resin film adhesive to harden; and/or discontinuing application of the heat upon expiration of the second period of time. Battens or other suitable points of attachment can be bonded to the CNT mesh material in a similar manner.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the embodiments have been illustrated and described with respect to one or more implementations, equivalent alterations and modifications will occur to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application. Thus, the breadth and scope of the embodiments disclosed herein should not be limited by any of the above described embodiments. Rather, the scope of the invention should be defined in accordance with the following claims and their equivalents.

We claim:

1. A deployable reflector system, comprising:
- a support structure;
- a reflector surface connected to the support structure;
- the reflector surface comprised of a carbon nanotube (CNT) sheet which is highly reflective of electromagnetic waves;
- the support structure configured to transition from a compact stowed configuration to a larger deployed configuration;
- the CNT sheet intricately folded in accordance with a predetermined folding pattern to define a compact folded state when the support structure is in the stowed configuration; and
- the predetermined folding pattern configured to permit automatic extension of the CNT sheet from the compact folded state to a fully unfolded state when a tension force is applied to at least a portion of the CNT sheet by the support structure;
- the CNT sheet is comprised of a plurality of separate pieces of CNT sheet which are bonded together in a predetermined piece pattern so as to form a concave or parabolic shape when the CNT sheet is in the fully unfolded state;
- wherein the predetermined folding pattern is defined by primary fold elements including an inner polygon and an outer polygon; and
- wherein the inner polygon has predetermined number corners defined by the value n, and the outer polygon has a predetermined number of points or corners defined by the value 2n.

2. The deployable reflector system according to claim 1, wherein the support structure is a circumferential hoop.

3. The deployable reflector system according to claim 2, wherein the reflector surface has an outer peripheral edge that is secured to the circumferential hoop.

4. The deployable reflector system according to claim 3, wherein the circumferential hoop in the compact stowed configuration has a first diameter that is minimized for compact storage, and in the larger deployed configuration has a second diameter substantially larger than the first diameter.

5. The deployable reflector system according to claim 2, wherein the CNT sheet is responsive to the transition of the circumferential hoop from the compact stowed configuration to the larger deployed configuration for causing the CNT sheet to transition from the compact folded state to the fully unfolded state.

6. The deployable reflector system according to claim 1, wherein the CNT sheet is comprised of a laser cut mesh.

7. The deployable reflector system according to claim 1, wherein the CNT sheet is comprised of a weave or a knit.

8. The deployable reflector system according to claim 1, wherein the inner polygon and the outer polygon have a common center point.

9. A deployable reflector system, comprising:

a support structure;

a reflector surface connected to the support structure;

the reflector surface comprised of a carbon nanotube (CNT) sheet which is highly reflective of electromagnetic waves;

the support structure configured to transition from a compact stowed configuration to a larger deployed configuration;

the CNT sheet intricately folded in accordance with a predetermined folding pattern to define a compact folded state when the support structure is in the stowed configuration; and the predetermined folding pattern configured to permit automatic extension of the CNT sheet from the compact folded state to a fully unfolded state when a tension force is applied to at least a portion of the CNT sheet by the support structure;

wherein the CNT sheet is comprised of a solid non-mesh surface;

wherein the predetermined folding pattern is defined by primary fold elements including an inner polygon and an outer polygon; and wherein the inner polygon has predetermined number corners defined by the value n, and the outer polygon has a predetermined number of points or corners defined by the value 2n.

10. A deployable reflector system, comprising:

a support structure;

a reflector surface connected to the support structure;

the reflector surface comprised of a carbon nanotube (CNT) sheet which is highly reflective of electromagnetic waves;

the support structure configured to transition from a compact stowed configuration to a larger deployed configuration;

the CNT sheet intricately folded in accordance with a predetermined folding pattern to define a compact folded state when the support structure is in the stowed configuration; and the predetermined folding pattern configured to permit automatic extension of the CNT sheet from the compact folded state to a fully unfolded state when a tension force is applied to at least a portion of the CNT sheet by the support structure;

wherein the predetermined folding pattern is defined by three primary fold elements including an inner polygon, an outer polygon, and a plurality of wedges; and wherein the inner polygon has predetermined number corners defined by the value n, and the outer polygon has a predetermined number of points or corners defined by the value 2n.

11. The deployable reflector system according to claim 10, wherein each wedge is defined by a pair of wedge fold lines which respectively extend from adjacent corners of the inner polygon to alternate corners of the outer polygon.

12. The deployable reflector system according to claim 11, wherein each wedge is folded to form a plurality of segments, the segments defined by a plurality of cross-fold lines respectively associated with a plurality of cross-folds, the cross-fold lines of each wedge extending parallel to one another between opposing wedge fold lines of the wedge.

13. The method according to claim 11, further comprising using a plurality of cross-folds defined along cross-fold lines to form a plurality of segments from each of the plurality of wedges, the cross-fold lines of each wedge extending parallel to one another between opposing wedge fold lines of the wedge.

14. A method for deploying a reflector system, comprising:

forming the CNT sheet in a concave or parabolic shape by bonding together a plurality of separate pieces of CNT sheet in a predetermined piece pattern;

intricately folding in accordance with a predetermined folding pattern CNT sheet which is highly reflective of electromagnetic waves to configure the CNT sheet in a compact folded state;

selecting the predetermined folding pattern to permit automatic extension of the CNT sheet from the compact folded state to a fully unfolded state when a tension force is applied to at least a portion of peripheral edge of the CNT sheet;

securing the CNT sheet to a support structure;

transitioning the support structure from a compact stowed configuration to a larger deployed configuration to deploy the reflector surface;

wherein the predetermined folding pattern is defined by primary fold elements including an inner polygon and an outer polygon; and wherein the inner polygon has predetermined number corners defined by the value n, and the outer polygon has a predetermined number of points or corners defined by the value 2n.

15. The method according to claim 14, further comprising arranging the support structure to define a circumferential hoop.

16. The method according to claim 15, further comprising securing an outer peripheral edge of the reflector surface to the circumferential hoop.

17. The method according to claim 16, further comprising arranging the circumferential hoop so that in the compact stowed configuration it has a first diameter that is minimized for compact storage, and in the larger deployed configuration has a second diameter substantially larger than the first diameter.

18. The method according to claim 15, further comprising causing the CNT sheet to transition from the compact folded state to the fully unfolded state by enlarging the circumferential hoop from the compact stowed configuration to the larger deployed configuration to.

19. The method according to claim 14, further comprising forming the CNT sheet of a laser cut mesh.

20. The method according to claim 14, further comprising forming the CNT sheet of a weave or a knit.

21. The method according to claim 14, wherein the predetermined folding pattern is further defined by a plurality of wedges.

22. The method according to claim 14, wherein the inner polygon and the outer polygon have a common center point.

23. A method for deploying a reflector system, comprising:

forming a carbon nanotube (CNT) sheet of a solid, non-mesh, surface;

intricately folding in accordance with a predetermined folding pattern the CNT sheet which is highly reflective of electromagnetic waves to configure the CNT sheet in a compact folded state;

selecting the predetermined folding pattern to permit automatic extension of the CNT sheet from the compact folded state to a fully unfolded state when a tension force is applied to at least a portion of peripheral edge of the CNT sheet;

securing the CNT sheet to a support structure; and transitioning the support structure from a compact stowed configuration to a larger deployed configuration to deploy the reflector surface;

wherein the predetermined folding pattern is defined by primary fold elements including an inner polygon and an outer polygon; and wherein the inner polygon has predetermined number corners defined by the value n, and the outer polygon has a predetermined number of points or corners defined by the value.

24. A method for deploying a reflector system, comprising:

intricately folding in accordance with a predetermined folding pattern a carbon nanotube (CNT) sheet which is highly reflective of electromagnetic waves to configure the CNT sheet in a compact folded state;

selecting the predetermined folding pattern to permit automatic extension of the CNT sheet from the compact folded state to a fully unfolded state when a tension force is applied to at least a portion of peripheral edge of the CNT sheet;

securing the CNT sheet to a support structure;

transitioning the support structure from a compact stowed configuration to a larger deployed configuration to deploy the reflector surface;

wherein the predetermined folding pattern is defined by three primary fold elements including an inner polygon, an outer polygon, and a plurality of wedges; and wherein the inner polygon has predetermined number corners defined by the value n, and the outer polygon has a predetermined number of points or corners defined by the value 2n.

25. The method according to claim 24, further comprising forming each of the plurality of wedges with a pair of wedge fold lines which respectively extend from adjacent corners of the inner polygon to alternate corners of the outer polygon.

* * * * *